United States Patent [19]
Litke

[11] 3,816,003
[45] June 11, 1974

[54] SEALED LINEAR ENCODER

[75] Inventor: E. David Litke, Andover, Mass.

[73] Assignee: Dynamics Research Corporation, Wilmington, Mass.

[22] Filed: Mar. 12, 1973

[21] Appl. No.: 340,067

[52] U.S. Cl.............. 356/169, 356/172, 33/125 C
[51] Int. Cl. .......................................... G01b 11/04
[58] Field of Search ............ 356/169, 170; 250/239, 250/237 G; 33/125 C

[56] References Cited
UNITED STATES PATENTS
| | | | |
|---|---|---|---|
| 2,886,717 | 5/1959 | Williamson et al. | 356/170 |
| 3,451,054 | 6/1969 | Johnson | 356/169 X |
| 3,579,836 | 5/1971 | Kraus | 33/1 R |

Primary Examiner—Ronald L. Wibert
Assistant Examiner—Paul K. Godwin
Attorney, Agent, or Firm—Weingarten, Maxham & Schurgin

[57] ABSTRACT

An electro-optical encoder providing uniform high sensitivity measurement of the magnitude and direction of linear motion even under adverse industrial conditions. A scale and reticle are arranged for relative motion and enclosed by a housing having a seal which allows lengthwise travel of a narrow blade coupled to the reticle without allowing foreign matter to enter the encoder. The effects of externally caused vibrations are minimized by a biased coupler which maintains the reticle in uniform engagement with the scale as it moves longitudinally relative to the scale along a track, formed by the scale surface and a smooth surface of the housing.

13 Claims, 6 Drawing Figures

PATENTED JUN 11 1974 3,816,003

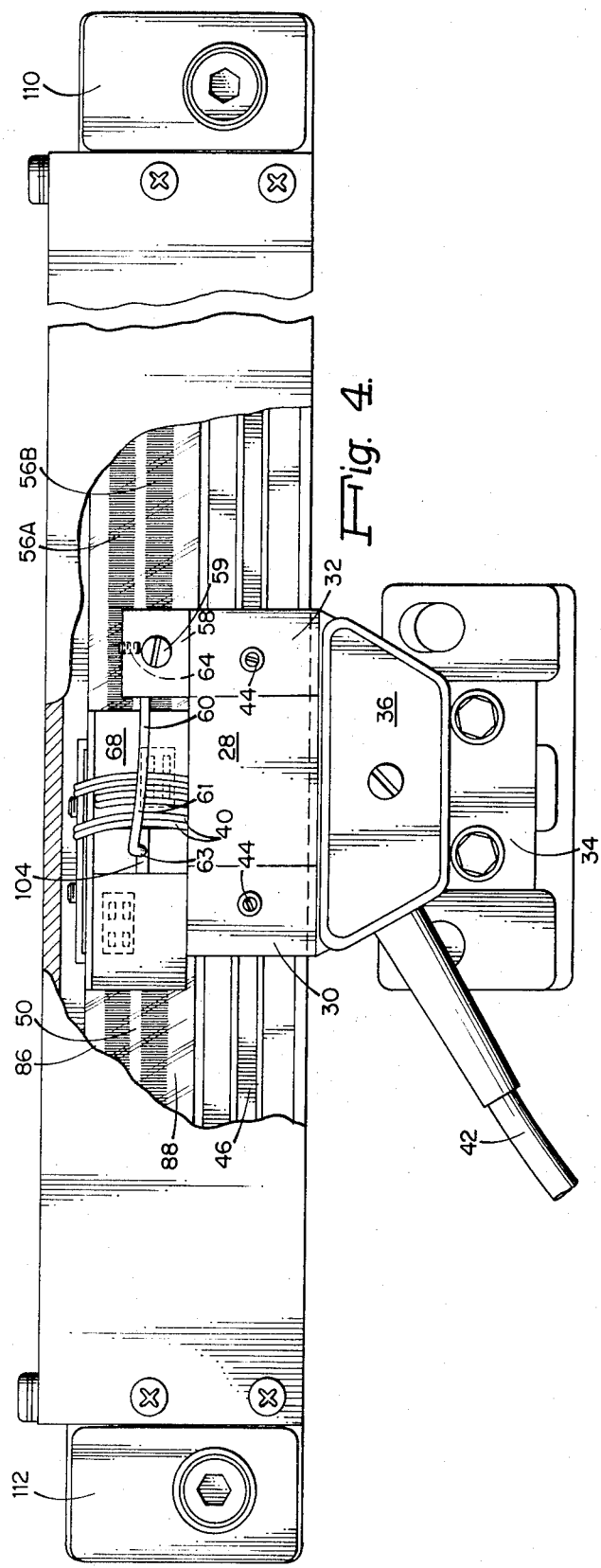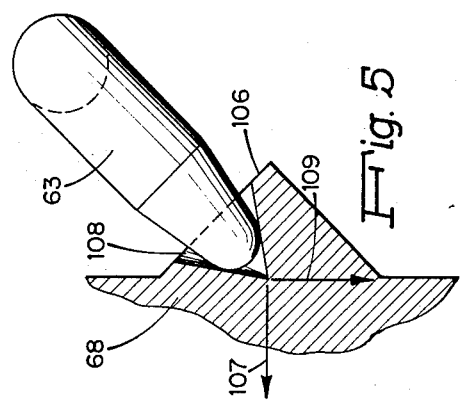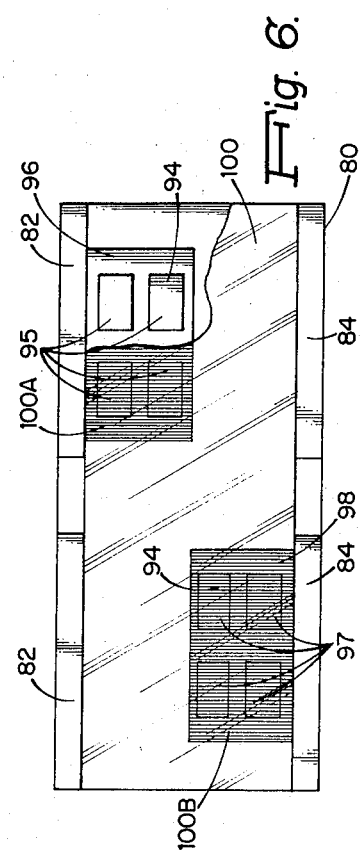

SEALED LINEAR ENCODER

FIELD OF THE INVENTION

This invention relates in general to position encoders, and more particularly to an electro-optical linear encoder suitable for operation in an adverse environment while maintaining a uniformly high degree of sensitivity.

BACKGROUND OF THE INVENTION

Encoders are employed in a variety of applications to indicate the position of a moving element along a predetermined path. Linear encoders, in particular, provide an output indication of position along a linear travel path. In one class of encoders known as incremental encoders, light is directed through a scale having an array of regular rulings arranged along the length thereof and cooperative with a ruled reticle to produce an optical fringe pattern, commonly known as moire fringes, the movement of which is indicative of relative motion between the reticle and scale. The fringe pattern is sensed by one or more photosensors arranged to receive light from the optical pattern and operative to produce electrical signals representative of relative position. These signals are then processed by associated electronic circuitry to provide intended output indications. Such linear encoders are especially useful in monitoring the position of machine elements such as in automatic systems for controlling machine tool operation. However, the environment inherent in usual machine tool operation or in other industrial applications is unsuitable for the efficient operation of delicate optical measuring apparatus. In order to maintain requisite sensitivity, electro-optical encoders usually require precise and uniform alignment of their relatively moving members along the entire travel path. Dirt and other contamination found in an industrial environment are inimical to proper encoder operation since such contamination can result in damage to the optical and other system elements, interference with uniform encoder operation and impairment of system accuracy. Vibration often present in an industrial environment can also affect encoder performance by interference with optical alignment along the length of the travel path.

SUMMARY OF THE INVENTION

Briefly, in accordance with the invention, an economical electro-optical linear encoder is provided especially adapted for operation in adverse industrial environments and capable of maintaining reliable and accurate operation even under conditions of vibration, dirt and other contamination. An elongated scale having an array of rulings along the length thereof is supported in fixed disposition within a surrounding housing, and an optical assembly including a reticle is disposed within the housing and arranged for movement along the length of the ruled scale and supported in accurate disposition with respect to the scale by a track which includes one or more surfaces of the scale and of the surrounding housing. A coupler is provided to maintain precise alignment of the reticle relative to the track and scale, the coupler providing rigid longitudinal drive of the reticle along the length of the scale and resilient biasing of the reticle and scale into predetermined spaced relationship. The housing interior is substantially isolated from external contamination by means of a resilient seal extending along the length of the housing and which allows a thin member to travel therethrough. The thin member is connected to the optical assembly inside the housing and to an external moving member, the motion of which is being monitored, and also provides electrical coupling from the optical assembly to utilization apparatus and an energizing source.

BRIEF DESCRIPTION OF THE DRAWING

The invention will be more fully understood from the following detailed description, taken in conjunction with the accompanying drawing, wherein:

FIG. 4 is an elevation view, partially cutaway, of the embodiment of FIG. 1;

FIG. 5 is a partially cutaway enlarged view of a coupler employed in the invention; and FIG. 6 is an elevation view of the reticle holder employed in the embodiment of FIG. 1.

DETAILED DESCRIPTION OF THE INVENTION

Figure 1:
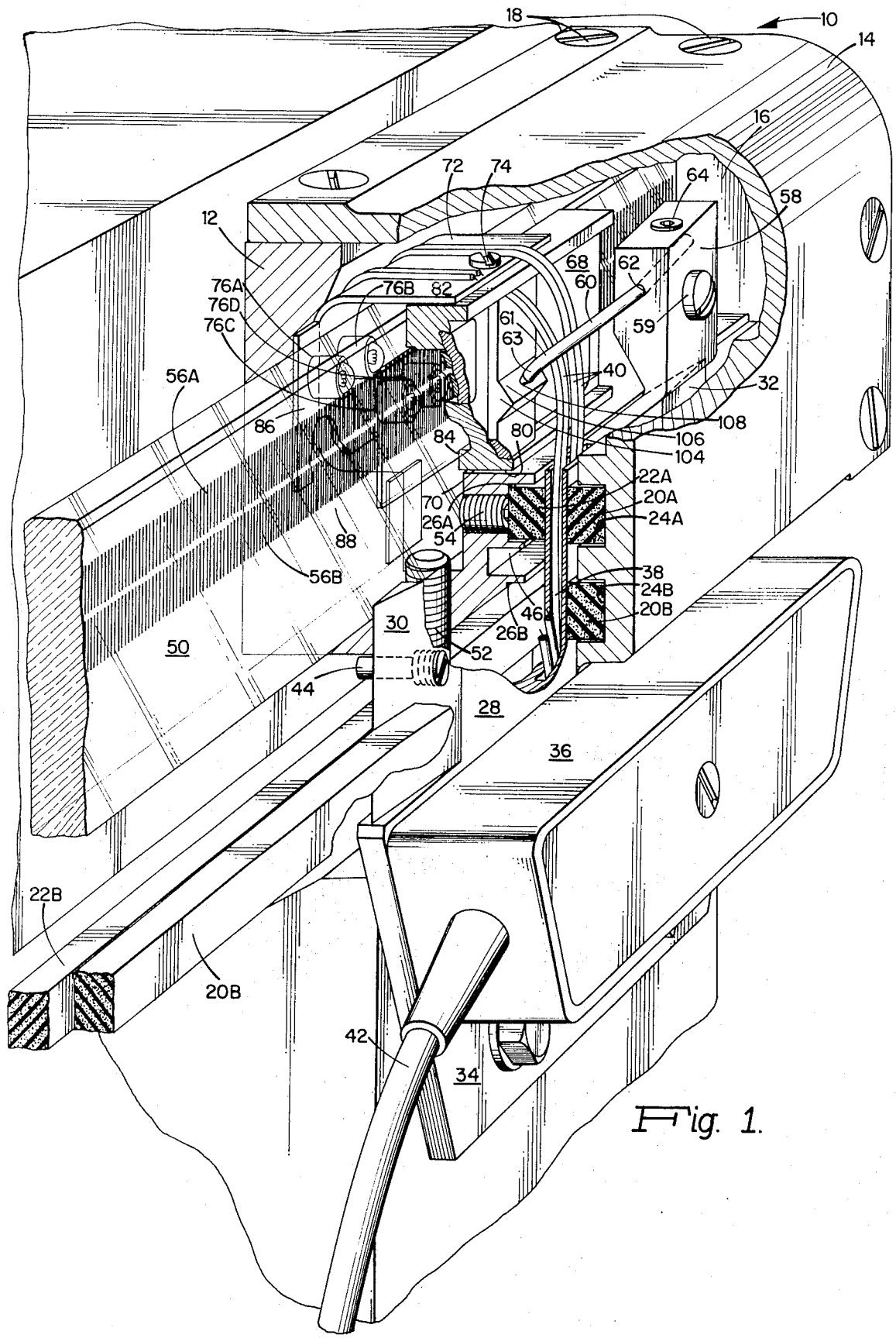
FIG. 1 is a partially cutaway pictorial view of a linear encoder constructed in accordance with the invention.
Figure 2:
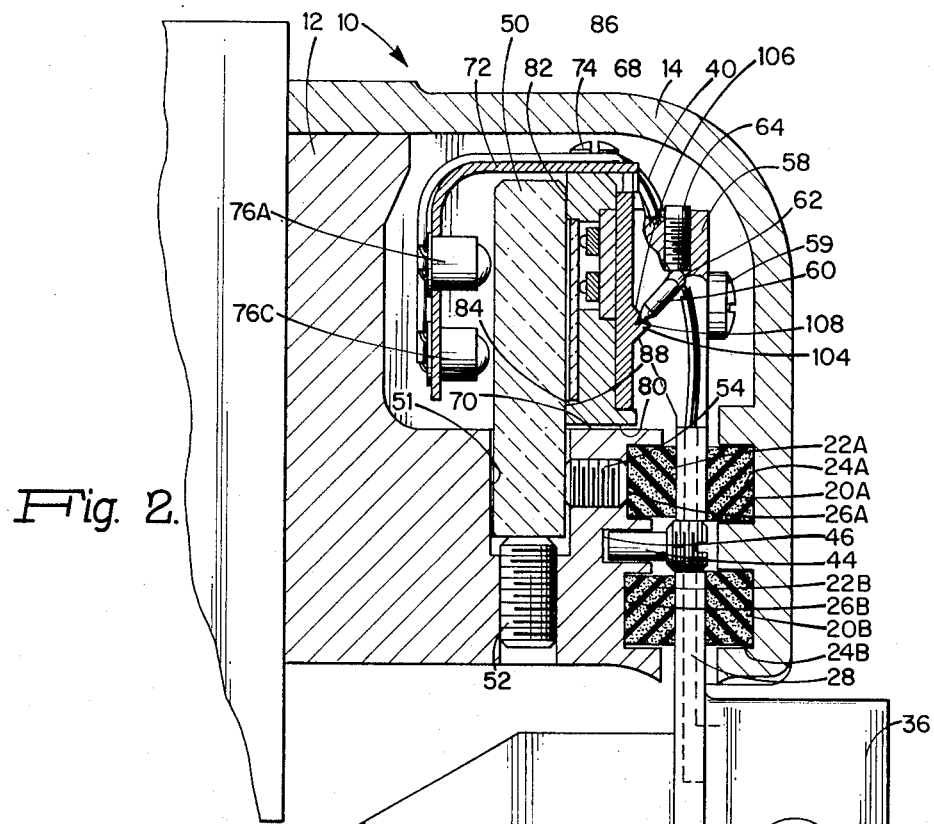
FIG. 2 is a sectional elevation view of the embodiment of FIG. 1.
Figure 3:
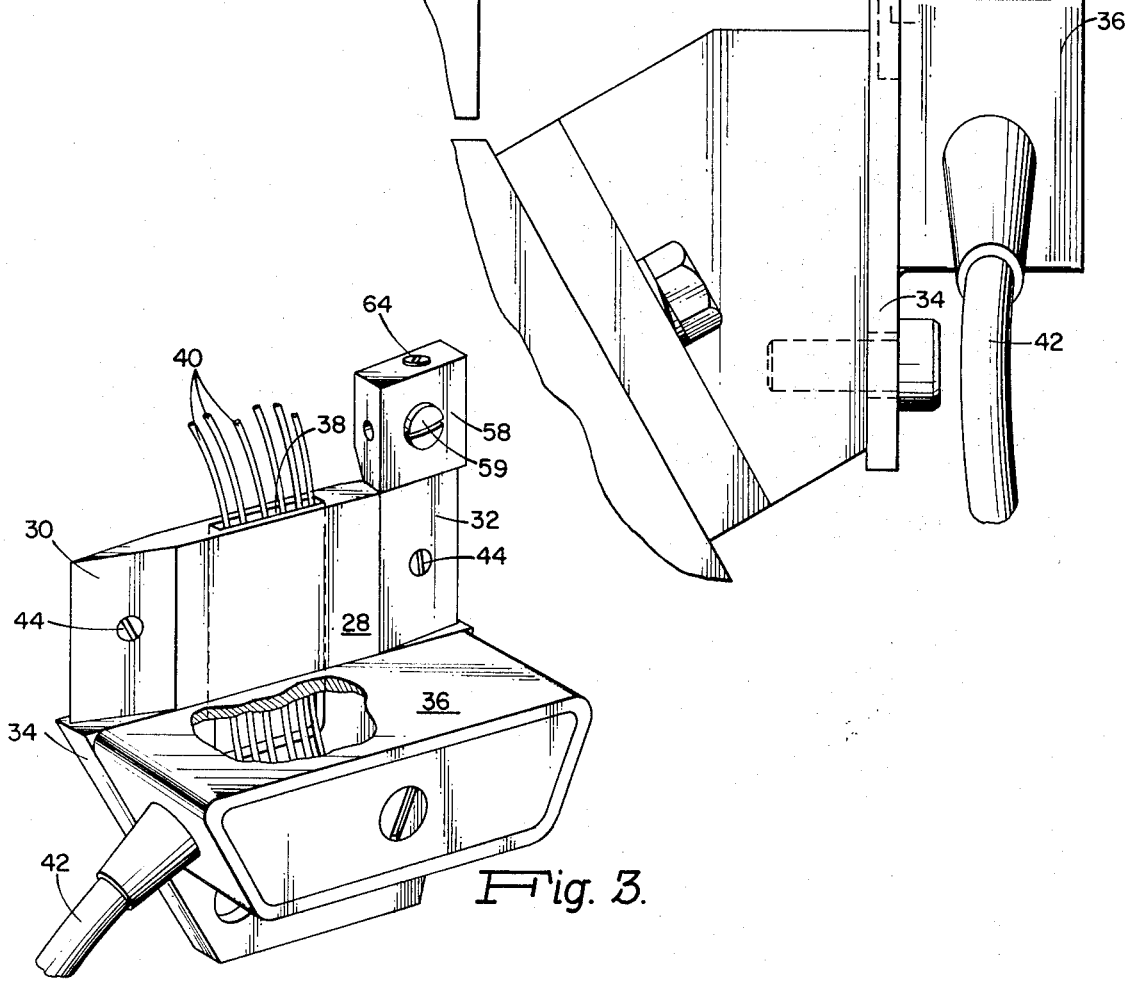
FIG. 3 is a pictorial view of the blade and junction box of the embodiment of FIG. 1.

The invention is illustrated in a preferred embodiment in FIGS. 1 and 2, wherein an enclosed and substantially sealed linear encoder is shown having a housing indicated generally at 10 and comprised of a longitudinal base member 12, a cover member 14, and first and second end members 16. Base member 12 and cover 14 may be conveniently formed of extruded sections of aluminum or other suitable material, while end members 16 may be formed of any suitable material, also typically aluminum. Base member 12, cover 14 and end members 16 are secured together to form housing 10 by machine screws 18 or other fastening means. Longitudinal seals 20A and 20B and 22A and 22B which are typically formed of a compressible material such as foam rubber are provided to complete the sealed enclosure. Preferably, the seal material is formed of closed cells which do not readily absorb moisture or other foreign matter. The seals 20A and 20B are partially recessed and are retained in respective grooves 24A and 24B provided in cover 14, while seals 22A and 22B are retained in respective grooves 26A and 26B in the base member 12. Longitudinal seals 20A and 22A and 20B and 22B form respective upper and lower seals to substantially insulate the interior of housing 10 from the working environment. Alternatively a housing could be provided having only a single seal. The compressible nature of the seals permits a blade member 28 to move along a longitudinal path through the seals while maintaining substantial sealing of the housing. Blade 28, seen additionally in FIGS. 3 and 4, is of relatively thin cross section, having both forward and backward tapered edges 30 and 32, respectively, which permit relatively free, unimpeded movement of the blade between the seals with minimum disturbance of the seal and with minimum wear on the seals.

Blade 28 is part of or is affixed to a plate 34 to which is mounted a junction box 36 which can contain associated circuitry and terminal connections for applying energy to the encoder and receiving signals therefrom. An opening 38 is provided through blade 28 and through which interconnecting wires 40 can pass. Junction box 36 is in electrical communication with an external power source and utilization means through a flexible cable 42 which does not impede relative motion between blade 28 and the housing 10. The motion of blade 28 relative to housing 10 is governed by pins 44 affixed to the blade, such as by threaded end portions, and which each extend from the blade into a longitudinal groove 46 provided along the length of base member 12 parallel to the axis of movement. The dimensions of groove 46 are selected to maintain alignment of blade 28 in the vertical plane, while allowing unimpeded horizontal travel of the blade with respect to the housing. The pins are operative to support the entire blade and associated apparatus in a desired position relative to the housing during assembly, shipping and installation or otherwise when the blade 28 is not otherwise fixed relative to the housing.

A scale 50, which is made of a suitable transparent material such as glass having uniform, smooth surfaces, is mounted in predetermined, fixed registration with base member 12. The scale is typically bonded to surface 51 of base member 12 by means of a soft bond material, typically double sided adhesive tape and is maintained in a desired position relative to the housing by means of vertically adjustable set screws 52 and horizontally adjustable set screws 54. The screws are typically formed of a plastic material which when brought into pressured contact with scale 50 will not cause scratching or distortion thereof. Scale 50 can be of any length to suit specific operational requirements and typically has a length of about 4 feet. The scale is typically ruled on one surface with a series of alternately opaque and transparent segments arranged in a parallel array along the longitudinal axis of the scale. The particular ruling density will depend on the resolution intended, typical densities usually being up to 2,500 lines per inch. In the embodiment shown, two ruled patterns 56A and 56B are provided on scale 50 and which are ruled on an English and metric basis, respectively, to produce corresponding types of output indications of position.

A coupler mounting member 58 is provided at an upper corner of blade 28. A machine screw 59, typically formed of a soft plastic material such as nylon, is threaded through member 58 to provide bumpers to prevent contact between member 58 and scale 50 or housing 10 during assembly and disassembly. A coupler 60 is inserted at one end thereof into an opening 62 in mounting member 58 and is secured in position by means of a set screw 64. The coupler 60 is constructed of suitable material typically of wire form and which is biased and resilient in directions transverse to its axis and which comprises two segments, a longer longitudinal segment 61 and a shorter segment 63 disposed along an axis transverse to the direction of relative motion. The end of the shorter segment includes a tapered portion which engages a recess 108 in a reticle holding member 68. Reticle holder 68 is formed of a suitable rigid material with good wear characteristics, such as an acetalfluorocarbon resin having the tradename "Delrin." The side of the reticle holder opposite to that confronting the scale lies generally in the vertical plane except for an outwardly extending ridge 104 which has a top surface 106 disposed downwardly at a 45° tilt from the horizontal axis. The recess or cavity 108 extends into ridge 104 from this surface 106.

A right angle bracket 72 is affixed by means of machine screws 74 to the top of reticle holding member 68, and extends in a plane parallel to scale 50 for support of an array of light sources 76A, 76B, 76C and 76D arranged to illuminate the ruled pattern on the scale. The light sources are typically light emitting diodes providing uniform light emission, and are provided with electrical power by means of certain of lead wires 40 which communicate with an electrical power source through opening 38 in blade 28, junction box 36 and cable 42. Light sources 76A and 76B are positioned opposite the upper pattern of rulings 56A, while light sources 76C and 76D are positioned opposite the lower pattern of rulings 56B. Light sources 76A and 76B are horizontally displaced from light sources 76C and 76D to eliminate optical interference therebetween.

As illustrated most clearly in FIG. 5, the coupler is biased such that the shorter segment 63 transmits a force to reticle holder 68 in a direction substantially perpendicular to surface 106 and which is resolved into substantially equal horizontal and vertical components of force, shown by arrows 107 and 109. The reticle holder 68 is thereby biased into contact with the guiding surfaces of the scale and housing with respect to which it moves. The coupler is substantially rigid in the longitudinal direction (parallel to the axis of motion), while being resilient in the transverse plane (perpendicular to the axis of motion). The resilient coupling in the transverse plane allows motion along axes, indicated by arrows 107 and 109, transverse to the direction of motion. As a result, the precise spatial relationship between the scale and reticle is maintained even in the presence of vibration caused by external effects or distortions of the travel path surfaces.

Referring now additionally to FIG. 6, reticle holding member 68 is shown formed with a bottom bearing surface 80 which is maintained in contact with a confronting longitudinal smooth surface 70 of base member 12 as the reticle holder moves relative to the scale. The reticle holder also has upper and lower bearing surfaces 82 and 84, respectively, provided on one side thereof and which are maintained in contact with respective confronting surface portions 86 and 88 of scale 50. In the illustrated embodiment, bearing surfaces 82 and 84 are perpendicular to bearing surface 80; however, the invention can also be implemented with bearing surfaces in other than perpendicular disposition. The bearing surfaces 82 and 84 are of limited surface area and in spaced relationship to reduce frictional resistance to relative movement between the scale and reticle holder, as well as to minimize the effects of minor variations and discontinuities in the track surfaces. The respective ruled portions of the scale and reticle are thus maintained in predetermined accurate spaced relationship during relative motion of the scale and reticle along the travel path.

Arrays 95 and 97 of four photodetectors 94, typically of the solar or photovoltaic type, are provided in each of two recesses 96 and 98 in registration with respective upper and lower ruled patterns 56A and 56B on scale 50. A reticle plate 100 having ruled patterns 100A and 100B, identical to respective ruled patterns 56A and 56B on scale 50, is provided on reticle holder 68 with the respective ruled patterns arranged over the respective photosensor arrays 95 and 97. The sensors of each array are in light receiving relationship with corresponding light sources on the opposite side of scale 50. An optical path is thereby provided from the light sources, through the ruled patterns of the scale and reticle to the photosensors.

The reticle patterns are maintained in a slightly skewed orientation with respect to the respective ruled patterns on the scales to produce a fringe pattern in well known manner. Each array of photosensors detects the movement of the fringe pattern, which is indicative of relative motion between the reticle and the scale. Electrical signals from the sensor arrays are provided via wiring 40 to associated signal processing circuitry which provides output indications of the amount and sense of motion.

Alternatively, instead of employing a scale and reticle which are in skewed relative orientation, a scale and reticle having a different number of rulings per unit length may be employed. For example, a reticle having $n$ rulings per unit length and a scale having $n + 1$ rulings per unit length, would provide a suitable fringe pattern, as is known.

In typical operation of the invention, the mounting plate 34 is attached to a stationary portion of a machine such as a milling machine. The housing of the encoder is affixed to a movable portion of the machine such as by flange portions 110 and 112 (FIG. 4). Three-dimensional motion of a machine tool can be monitored by employing linear encoders similarly attached along three orthogonal axes of the machine. As the reticle is caused to move relative to the scale, the photosensors sense the varying light and dark portions of the moving fringe pattern which is produced by the confronting scale and reticle patterns, to produce an output indication in response thereto which is processed by suitable processing circuitry and displayed by display means indicating the extent and sense of motion. The output of the encoder may also be applied to control circuits in an automated system.

Various modifications and alternative implementation of the invention will now occur to those versed in the art without departing from the spirit and true scope thereof. Accordingly, it is not intended to limit the invention by what has been particularly shown and described except as intended in the appended claims.

What is claimed is:

1. An electro-optical linear encoder comprising:
    an elongated rigid housing;
    an elongated scale, within said housing, having a plurality of alternately light responsive and non-responsive segments in parallel array along the longitudinal axis of one surface thereof and at least one first bearing surface thereon parallel to said longitudinal axis, along which an associated reticle means is caused to relatively move;
    said housing providing a second bearing surface parallel to said longitudinal axis lying in a plane intersecting the plane of said at least one; first bearing surface along which said associated reticle means is caused to relatively move;
    reticle means including a reticle having a longitudinal axis in said housing and having a plurality of alternately light responsive and non-responsive segments formed in a parallel array along the longitudinal axis of one surface thereof;
    means for directing light onto said scale and said reticle to provide a sensible fringe pattern;
    sensor means within said housing for detecting said fringe pattern and for providing electrical signals in response thereto;
    elongated resilient sealing means affixed to and disposed longitudinally of said housing for substantially isolating the interior of said housing from the external environment; and
    means for mounting said scale and reticle means for relative motion therebetween and along a longitudinal travel path within said housing defined by said first and second bearing surfaces and including:
    a blade member extending through said resilient sealing means into said housing and arranged for longitudinal motion relative to said scale; and
    coupling means including means operative to provide a biasing force to said reticle means, urging said reticle means into engagement with said first and second bearing surfaces and providing force components in the plane perpendicular to said longitudinal travel path;
    said coupling means operative to couple said reticle means to said blade member in fixed relationship along said longitudinal travel path and resiliently in at least one plane transverse to said longitudinal travel path.

2. An electro-optical encoder according to claim 1 wherein said resilient sealing means includes first and second pairs of confronting strips of resilient material forming a double seal along the length of said housing.

3. An electro-optical encoder according to claim 1 wherein said resilient sealing means includes confronting strips of resilient material of closed cell foam construction resistant to the absorption of foreign matter.

4. An electro-optical linear encoder according to claim 1 wherein said reticle means includes:
    a reticle holding member having at least two bearing surfaces including a first bearing surface in confronting association with said second bearing surface, of said housing, and a second bearing surface in confronting association with said at least one first bearing surface of said scale;
    said reticle holding member being adapted for relative motion along said travel path.

5. An electro-optical linear encoder according to claim 1 wherein said reticle means includes:
    a reticle holding member adapted for relative motion with respect to said scale and along said travel path;
    said reticle being mounted on said reticle holding member and having said parallel array of alternately light responsive and non-responsive segments in spaced confronting relationship with the parallel array of alternately light responsive and non-responsive segments on said scale;
    said sensor means being mounted on said reticle holding member for detection of light passing through said respective parallel arrays.

6. An electro-optical linear encoder according to claim 1 wherein said plurality of alternate light responsive and non-responsive segments are alternately light transmissive and opaque.

7. An electro-optical encoder according to claim 1 having guide means in said blade member and cooperative with a confronting groove along the length of said housing to prevent said reticle means from becoming misaligned in the event that the blade is temporarily not otherwise fixed externally to said housing in a suitable position relative to said housing.

8. An electro-optical linear encoder according to claim 5 wherein said light directing means includes:
at least one light source; and
a light source mounting bracket;
said light source mounting bracket being affixed to said reticle holding member for positioning of said at least one light source on the side of said scale opposite from said reticle holding member and in spaced registration with respective parallel arrays of alternately light responsive and non-responsive segments of said scale and reticle and with said photosensors.

9. An electro-optical linear encoder according to claim 8 wherein said sensor means includes a plurality of photosensors arranged in parallel spaced relationship and operative to provide an output voltage in response to light received from said arrays.

10. An electro-optical linear encoder according to claim 1 wherein grooves are provided within said housing and disposed along the longitudinal axis thereof and wherein said sealing resilient means are disposed within said grooves.

11. An electro-optical linear encoder according to claim 1 wherein said scale and said reticle each include at least first and second parallel arrays of alternately light responsive and non-responsive segments;
said first and second parallel arrays representing respective first and second measuring systems and wherein said encoder is operative to provide at least first and second output indications of relative movement expressed in accordance with said measuring systems.

12. An electro-optical linear encoder according to claim 1 wherein said means operative to provide a biasing force to said reticle means comprises
a member having a first elongate portion extending generally in parallel spaced relation to the longitudinal axis of said reticle means and a second elongate portion shorter than said first portion and extending generally transversely to the longitudinal axis of said reticle means.

13. An electro-optical linear encoder according to claim 12 wherein said reticle means includes an angled projection coupled to said second elongate portion and operative to resolve said biasing force applied to said reticle means into components urging said reticle means into engagement with said first and second bearing surfaces.

* * * * *